United States Patent
Magsombol et al.

(10) Patent No.: US 9,286,922 B1
(45) Date of Patent: Mar. 15, 2016

(54) ADAPTIVE TACKING OF HEAD GIMBAL ASSEMBLY LONG TAIL AND HSA ARM SLOT

(71) Applicant: Western Digital Technologies, Inc., Irvine, CA (US)

(72) Inventors: Fernando A. Magsombol, Muntinlupa (PH); Arnon Amornmannun, Mueang (TH); Saravut Ashametra, Bangpa-In (TH); Nitipat Songwiroj, Thanyaburi (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/752,646

(22) Filed: Jun. 26, 2015

(51) Int. Cl.
*G11B 5/48* (2006.01)
*B32B 37/18* (2006.01)
*B32B 37/12* (2006.01)
*B32B 41/00* (2006.01)
*G01B 5/14* (2006.01)

(52) U.S. Cl.
CPC .......... *G11B 5/4826* (2013.01); *B32B 37/1292* (2013.01); *B32B 37/18* (2013.01); *B32B 41/00* (2013.01); *G01B 5/14* (2013.01); *G11B 5/486* (2013.01); *G11B 5/4846* (2013.01); *B32B 2457/00* (2013.01)

(58) Field of Classification Search
CPC .... G11B 5/4826; G11B 5/4846; G11B 5/486; G01B 5/14
USPC .......................................... 360/245.2, 264.2
See application file for complete search history.

(56) References Cited

U.S. PATENT DOCUMENTS

| | | |
|---|---|---|
| 5,505,777 A | 4/1996 | Ciardella et al. |
| 6,049,973 A | 4/2000 | Frank, Jr. et al. |
| 6,271,996 B1 | 8/2001 | Houk et al. |
| 6,467,153 B2 | 10/2002 | Butts et al. |
| 6,651,192 B1 | 11/2003 | Viglione et al. |
| 6,657,801 B1 | 12/2003 | Chue et al. |
| 6,687,093 B1 | 2/2004 | Butler et al. |
| 6,751,041 B1 | 6/2004 | Codilian et al. |
| 6,779,252 B2 * | 8/2004 | Tracy ................... G11B 5/4826  29/603.03 |
| 6,788,480 B1 | 9/2004 | Codilian et al. |
| 6,791,782 B1 | 9/2004 | Codilian et al. |
| 6,792,669 B2 | 9/2004 | Codilian |
| 6,798,592 B1 | 9/2004 | Codilian et al. |
| 6,894,861 B1 | 5/2005 | Codilian et al. |
| 6,897,393 B1 | 5/2005 | Codilian et al. |

(Continued)

OTHER PUBLICATIONS

Phiphat Jungrungruangkit, et al., U.S. Appl. No. 13/931,163, filed Jun. 28, 2013, 17 pages.

*Primary Examiner* — Jefferson Evans

(57) ABSTRACT

A device may comprise a machine vision system in a first zone of the device. The machine vision system may be configured to provide measurements of gaps between selected portions of a head gimbal assembly (HGA) and selected portions of arms of a head stack assembly (HSA) of a data storage device. A first adhesive tacking system may be provided in a second zone of the device, and configured to sequentially apply adhesive to the gaps based upon the measurements of the gaps provided by the machine vision system. A transport mechanism may be configured to sequentially carry the HSA of the data storage device to the first zone to enable the machine vision system to measure the gaps and from the first zone to the second zone of the device to enable the first adhesive tacking system to apply the adhesive to the gaps.

19 Claims, 6 Drawing Sheets

(56) References Cited

U.S. PATENT DOCUMENTS

| | | |
|---|---|---|
| 6,898,044 B1 | 5/2005 | Chheda |
| 6,943,972 B1 | 9/2005 | Chue et al. |
| 7,003,626 B1 | 2/2006 | Chheda et al. |
| 7,027,242 B1 | 4/2006 | Terrill et al. |
| 7,046,467 B1 | 5/2006 | Chheda |
| 7,058,759 B1 | 6/2006 | Reiser et al. |
| 7,072,129 B1 | 7/2006 | Cullen et al. |
| 7,076,391 B1 | 7/2006 | Pakzad et al. |
| 7,076,603 B1 | 7/2006 | Chheda |
| 7,136,242 B1 | 11/2006 | Chue et al. |
| 7,139,145 B1 | 11/2006 | Archibald et al. |
| 7,145,744 B1 | 12/2006 | Clawson et al. |
| 7,178,432 B1 | 2/2007 | Han et al. |
| 7,199,959 B1 | 4/2007 | Bryant |
| 7,203,020 B1 | 4/2007 | Viglione et al. |
| 7,209,310 B1 | 4/2007 | Tsai et al. |
| 7,222,410 B1 | 5/2007 | Klassen et al. |
| 7,236,911 B1 | 6/2007 | Gough et al. |
| 7,269,525 B1 | 9/2007 | Gough et al. |
| 7,458,282 B1 | 12/2008 | Wuester, Sr. et al. |
| 7,490,398 B1* | 2/2009 | Klassen ............... G11B 5/4813 29/603.03 |
| 7,506,553 B1 | 3/2009 | Panyavoravaj |
| 7,549,204 B1 | 6/2009 | Vangal-Ramamurthy et al. |
| 7,552,526 B1 | 6/2009 | Klassen et al. |
| 7,559,590 B1 | 7/2009 | Jones |
| 7,561,416 B1 | 7/2009 | Sarraf |
| 7,596,722 B1 | 9/2009 | Pakzad et al. |
| 7,634,375 B1 | 12/2009 | Pakzad et al. |
| 7,653,983 B1 | 2/2010 | Klassen |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,743,486 B1 | 6/2010 | Klassen et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan et al. |
| 7,974,038 B2 | 7/2011 | Krishnan et al. |
| 7,980,159 B1 | 7/2011 | Han |
| 7,987,585 B1 | 8/2011 | Klassen et al. |
| 8,066,171 B1 | 11/2011 | Rakpongsiri et al. |
| 8,078,421 B1 | 12/2011 | Shastry et al. |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,199,425 B1 | 6/2012 | Gustafson et al. |
| 8,218,256 B1 | 7/2012 | Lin et al. |
| 8,223,448 B1 | 7/2012 | Haw et al. |
| 8,230,570 B1 | 7/2012 | Choong |
| 8,233,243 B2 | 7/2012 | Zhu et al. |
| 8,245,601 B1 | 8/2012 | Hastama et al. |
| 8,267,831 B1 | 9/2012 | Olsen et al. |
| 8,270,118 B1 | 9/2012 | Cheng et al. |
| 8,300,338 B1 | 10/2012 | McFadyen |
| 8,307,537 B1 | 11/2012 | Klassen et al. |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 8,707,531 B1 | 4/2014 | Sungkhaphong et al. |
| 8,713,333 B1 | 4/2014 | Selvaraj |
| 8,763,790 B1 | 7/2014 | Neamsuwan et al. |
| 8,789,446 B1 | 7/2014 | Sungkhaphong et al. |
| 8,811,135 B1 | 8/2014 | Kasino et al. |
| 8,869,385 B2* | 10/2014 | Chang ................. G11B 5/4846 29/603.03 |
| 8,996,143 B2* | 3/2015 | Vangal-Ramamurthy G11B 5/4806 700/59 |
| 2002/0038506 A1* | 4/2002 | Kamigama ......... G11B 5/4826 29/603.04 |
| 2002/0181157 A1 | 12/2002 | Serizawa et al. |
| 2004/0012891 A1* | 1/2004 | Habe .................... G11B 5/486 360/264.2 |
| 2005/0013055 A1* | 1/2005 | Ho ..................... G11B 5/4846 360/264.2 |
| 2005/0235510 A1* | 10/2005 | Ly ..................... G01B 5/0004 33/549 |
| 2008/0084630 A1 | 4/2008 | Trongjitwikrai et al. |
| 2009/0157848 A1 | 6/2009 | Khoo |
| 2010/0108256 A1 | 5/2010 | Roajanasiri et al. |
| 2010/0178433 A1 | 7/2010 | Wang et al. |
| 2012/0200287 A1* | 8/2012 | Warn .................. G11B 5/4826 324/212 |
| 2013/0057986 A1 | 3/2013 | Vangal-Ramamurthy et al. |
| 2013/0248545 A1 | 9/2013 | Thongjitti et al. |

\* cited by examiner

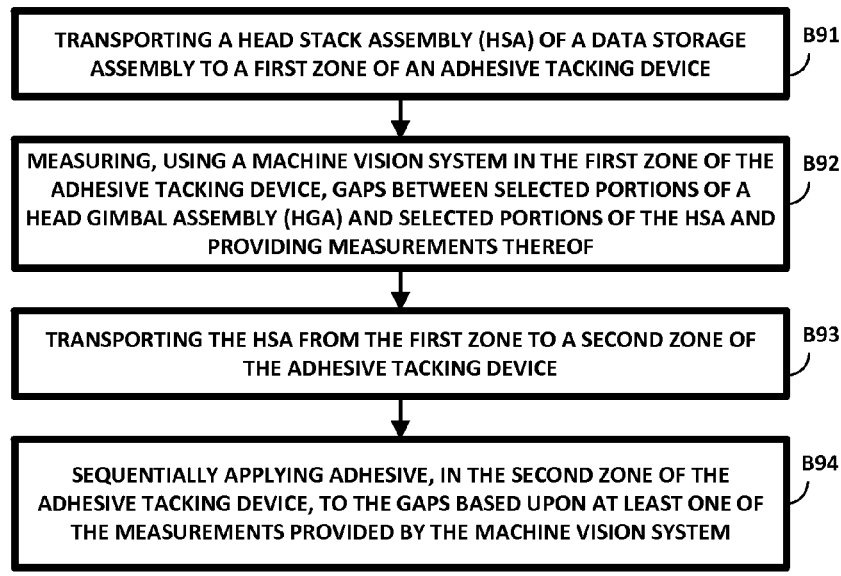

| Gap width measurement | 5 | 10 | 15 | 20 | 24 | 30 |
| --- | --- | --- | --- | --- | --- | --- |
| Number of Dot | 1 | 2 | 3 | 4 | 5 | 6 |
| The opening time of jet valve (msec) | 6.5 | 6.5 | 6.5 | 6.5 | 6.5 | 6.5 |

*FIG. 8*

| TRANSPORTING A HEAD STACK ASSEMBLY (HSA) OF A DATA STORAGE ASSEMBLY TO A FIRST ZONE OF AN ADHESIVE TACKING DEVICE | B91 |

↓

| MEASURING, USING A MACHINE VISION SYSTEM IN THE FIRST ZONE OF THE ADHESIVE TACKING DEVICE, GAPS BETWEEN SELECTED PORTIONS OF A HEAD GIMBAL ASSEMBLY (HGA) AND SELECTED PORTIONS OF THE HSA AND PROVIDING MEASUREMENTS THEREOF | B92 |

↓

| TRANSPORTING THE HSA FROM THE FIRST ZONE TO A SECOND ZONE OF THE ADHESIVE TACKING DEVICE | B93 |

↓

| SEQUENTIALLY APPLYING ADHESIVE, IN THE SECOND ZONE OF THE ADHESIVE TACKING DEVICE, TO THE GAPS BASED UPON AT LEAST ONE OF THE MEASUREMENTS PROVIDED BY THE MACHINE VISION SYSTEM | B94 |

ADAPTIVE TACKING OF HEAD GIMBAL ASSEMBLY LONG TAIL AND HSA ARM SLOT

BACKGROUND

Data storage devices are used to retrieve and/or store data in computers and other electronics devices. A magnetic hard disk drive is an example of a data storage device that includes one or more heads for reading data from and writing data to a spinning disk coated with a magnetic layer that stores the data. In modern magnetic hard disk drives, each head is a sub-component of a head-gimbal assembly (HGA) that typically includes a laminated flexure to carry electrical signals to and from the head(s). The HGA, in turn, is a subcomponent of a head-stack assembly (HSA) that typically includes a plurality of HGAs, an actuator, and a flex cable. The plurality of HGAs are attached to various arms of the actuator, and each of the laminated flexures of the HGAs has a flexure long tail that is electrically connected to the HSA's flex cable. The HGA long tail must be properly secured to the HSA arm to prevent it from moving or vibrating during operation of the magnetic disk drive.

BRIEF DESCRIPTION OF THE DRAWINGS

FIG. 8 is a table relating HGA long tail to HSA gap measurements to the number adhesive dots applied and the opening time of the jet adhesive dispenser, according to one embodiment.

FIG. 9 is a flowchart of a method according to one embodiment.

DETAILED DESCRIPTION

Conventionally, HGA long tails are adhesively tacked to HSA arms using a needle to contact both the actuator arm and the HGA long tail to dispense an amount of adhesive. The needle may be disposed at a 45 degree angle relative to the HSA arms while dispensing the adhesive. In so doing, the dispensing needle pushes the HGA long tail sideways to ensure that the adhesive will contact both the HGA long tail and HSA arm. This process can disturb the HGA long tail and is lengthy, which negatively affects yields.

Figure 1:
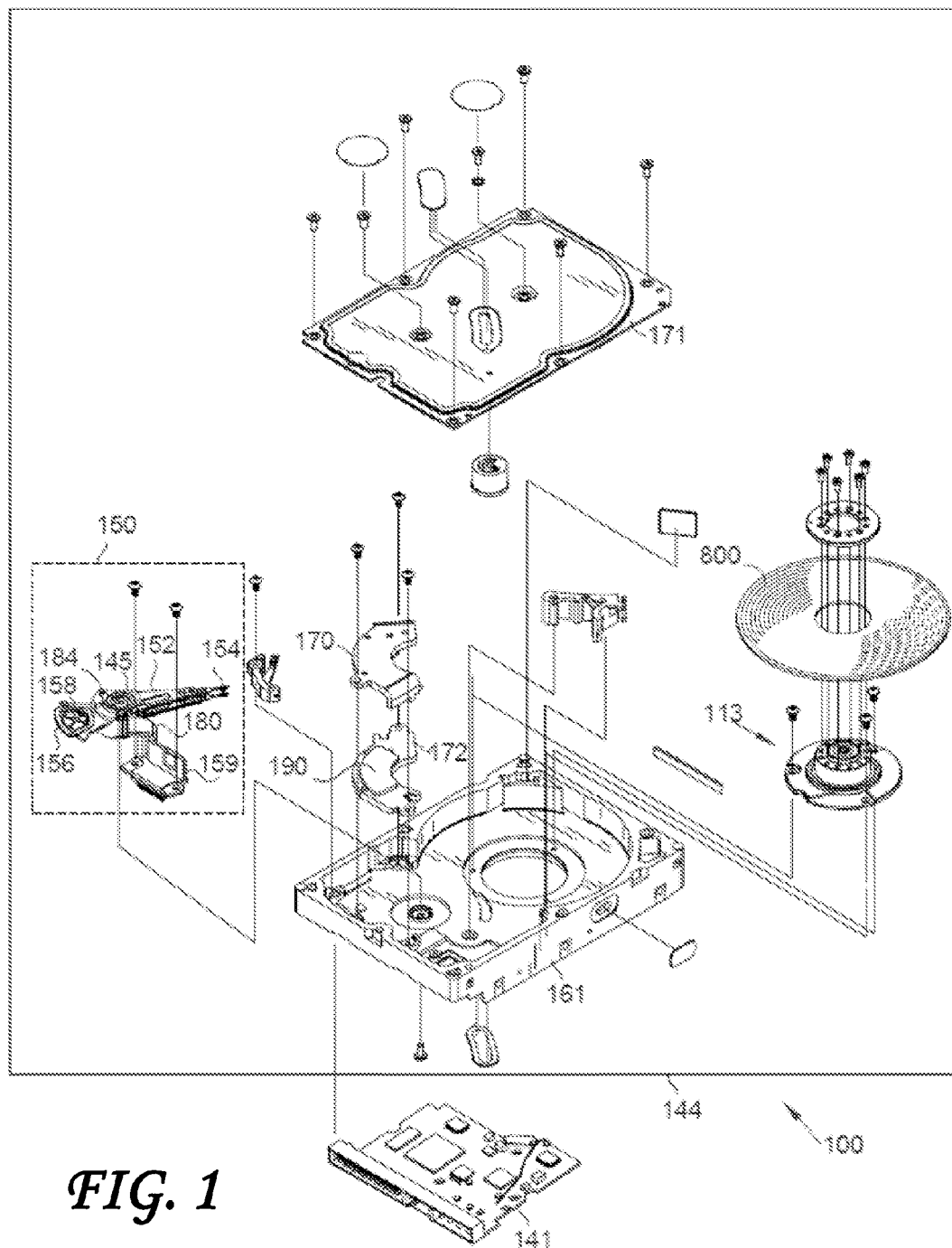
FIG. 1 is a block diagram of a disk drive comprising a HSA manufactured and configured according to one embodiment.

FIG. 1 shows the principal components of a magnetic disk drive 100 configured according to an embodiment of the present invention. With reference to FIG. 1, the disk drive 100 comprises a head disk assembly (HDA) 144 and a printed circuit board assembly (PCBA) 141. The HDA 144 includes a base 161 and a cover 171 attached to the base 161 that collectively house one or more disks 800 (only one disk 800 is shown in FIG. 1), a spindle motor 113 attached to the base 161 for rotating the disk 800, a HSA 150 according to one embodiment, and a pivot bearing cartridge 184 that rotatably supports the HSA 150 on the base 161. The spindle motor 113 rotates the disk 800 at a substantially constant angular velocity. The HSA 150 comprises a swing-type or rotary actuator assembly 152, at least one HGA that includes the suspension assembly 154, a flex circuit cable assembly 180 and a flex bracket 159. The rotary actuator assembly 152 includes a body portion 145, at least one actuator arm cantilevered from the body portion 145, and a coil assembly including a coil 156 cantilevered from the body portion 145 in an opposite direction from the actuator arm(s). A bobbin 158 may be attached to the inner periphery of the coil assembly to stiffen the coil assembly. The actuator arm(s) support respective suspension assembly(ies) that, in turn, support the head that includes the read/write transducer(s) for reading and writing to the disk 100. The HSA 150 is pivotally secured to the base 161 via the pivot-bearing cartridge 184 so that the read/write transducer(s) at the distal end of the suspension assembly(ies) may be moved over the recording surface(s) of the disk(s) 100. The pivot-bearing cartridge 184 enables the HSA 150 to pivot about its pivot axis. The "rotary" or "swing-type" actuator assembly rotates on the pivot bearing cartridge 184 between limited positions, and the coil assembly that extends from one side of the body portion 145 interacts with one or more permanent magnets 190 mounted to back irons 170, 172 to form a voice coil motor (VCM). When a driving voltage is applied to the VCM, torque is developed that causes the HSA 150 to pivot about the actuator pivot axis and causes the read/write transducer(s) to sweep radially over the disk 800. In the magnetic hard disk drive of FIG. 1, the head includes a body called a "slider" that carries a magnetic transducer on its trailing end (not visible given the scale of FIG. 1). The magnetic transducer may include an inductive write element and a magnetoresistive read element. During operation, the transducer is separated from the magnetic disk by a very thin hydrodynamic air bearing. As the motor 113 rotates the magnetic disk 800, this hydrodynamic air bearing is formed between an air bearing surface of the slider of head 40, and a surface of the magnetic disk 800. The thickness of the air bearing at the location of the transducer is commonly referred to as "flying height."

One embodiment includes a device configured to adaptively tack or apply adhesive between selected portions of the HGA and selected portions of the arms of the HSA. According to one embodiment, the location and amount of adhesive being applied may vary depending on the position and gap or distance between the selected portions of the HGA and the selected portions of the arm, as measured using a machine vision system.

Figure 2:
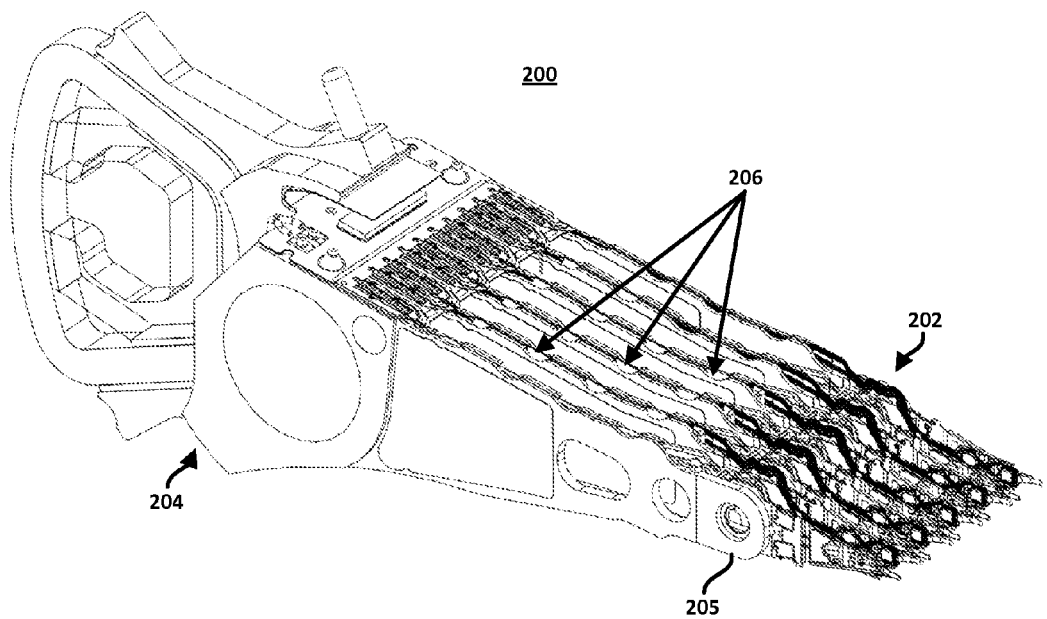
FIG. 2 is a perspective view of a HSA comprising HGA long tail to HSA adhesive tacking points, according to one embodiment.
Figure 3:
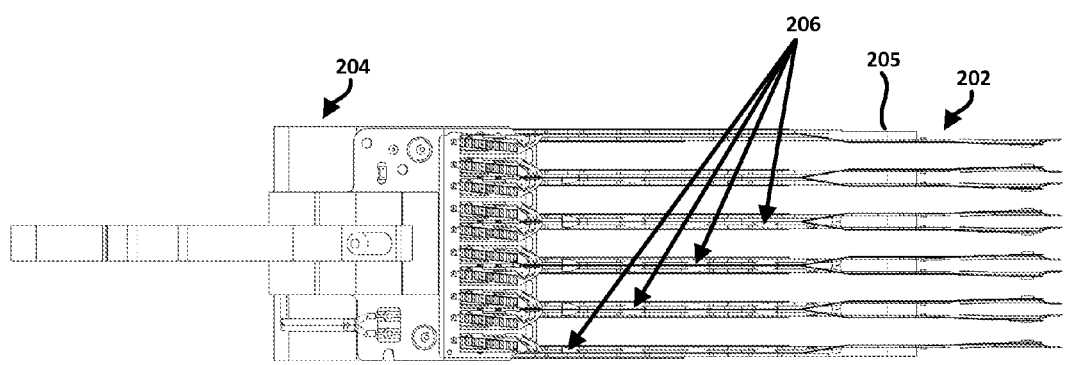
FIG. 3 is a side view of a HSA comprising HGA long tail to HSA adhesive tacking points, according to one embodiment.

FIG. 2 is a perspective view of a HSA comprising HGA long tail to HSA adhesive tacking points, according to one embodiment. FIG. 3 is a side view of a HSA comprising HGA long tail to HSA adhesive tacking points, according to one embodiment. As shown therein, the HSA 200 comprises an actuator assembly 204 that includes a plurality of actuator arms 205. HGAs 202 may be affixed to the actuator arms 205 through, for example, a ball swaging process. A selected portion of the HGAs 202 may be secured to the actuator arms 205 using adhesive applied at selected points. For example, the selected portions of the HGAs 202 that are to be secured to the actuator arms 205 may include the long tails of the HGA, which include conductive traces to and from the read and write transducers.

The HSA 200 may comprise actuator arms 205 that, as best shown in FIG. 2, define a plurality of adhesive tacking points 206 to which adhesive may be applied, to secure the selected portion of the HGA to a corresponding selected portion of the actuator arms 205. According to one embodiment, the adhesive tacking points 206 may be located at or near slots distributed along the length of the actuator arms 205. According to one embodiment, the long tails of the HGAs may span these slots, immediately adjacent thereto or may be separated therefrom by a small but measurable gap. These slots and the gaps between the HGA long tail may be imaged by a machine vision system in communication with an adhesive tacking system that is configured to selectively apply adhesive to secure the HGA long tails to the actuator arms 205.

Figure 4:
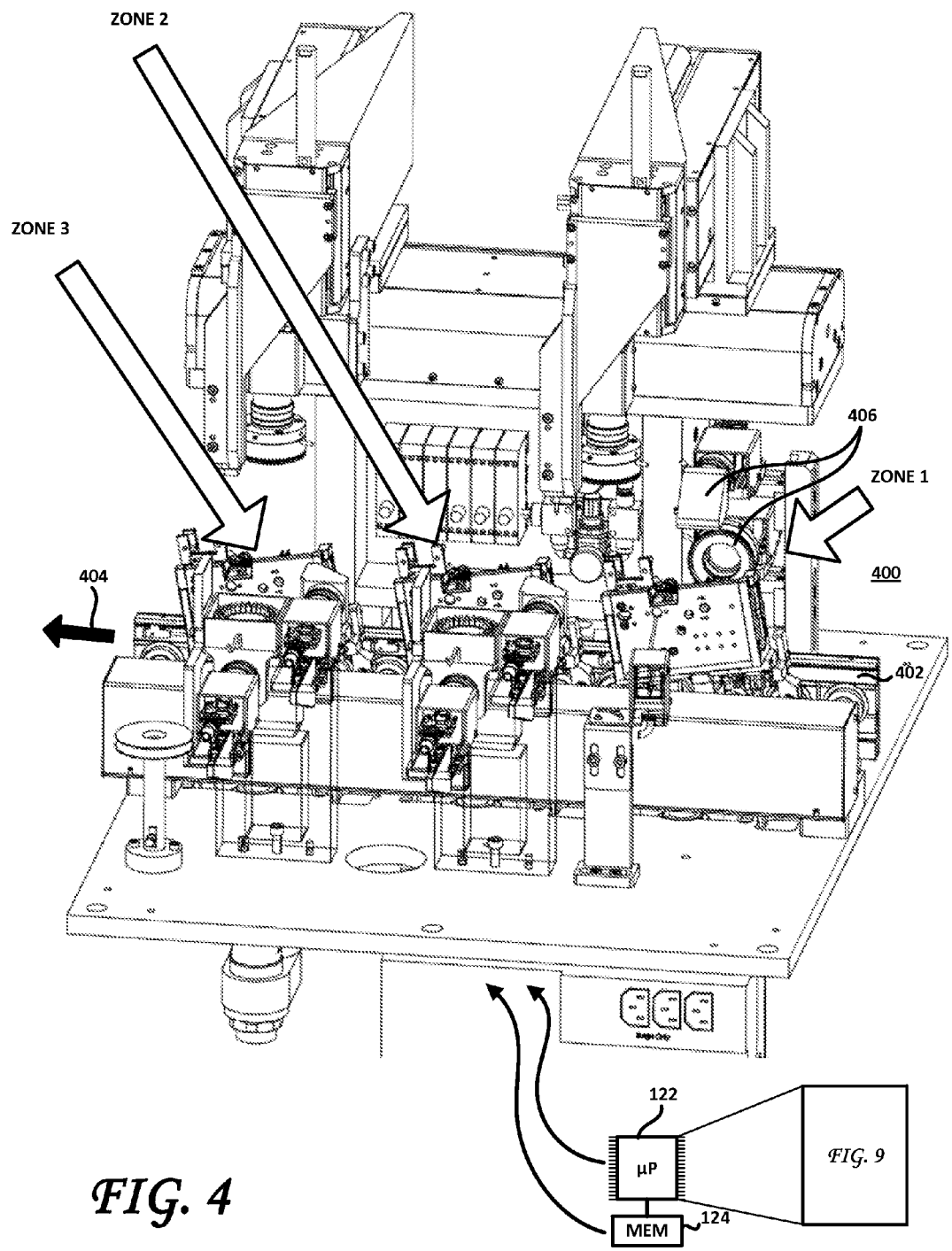
FIG. 4 is a view of a multi-zone jet adhesive dispenser assembly, according to one embodiment.

FIG. 4 is a view of a multi-zone jet adhesive dispenser assembly, according to one embodiment. As shown therein, the device or assembly 400 may comprise a plurality of functional areas or zones. In the implementation of FIG. 4, three zones are depicted. A transport mechanism, as shown at 402, may be provided to transport the HSA under manufacture from zone to zone, as suggested by arrow 404 in FIG. 4. According to one embodiment, the device 400 may comprise a machine vision system 406 in a first zone of the device. The machine vision system 406 may be configured to image the HSA under manufacture, process the captured image of the HSA and determine the selected location(s) where the adhesive is to be applied. According to one embodiment, the machine vision system 406 may be configured to image the HSA and determine, from the captured image or images, locations on the actuator arms 205 and corresponding locations on the HGA to which adhesive is to be applied. In one embodiment, the machine vision system may determine, from the image(s) of the HSA, the locations of the adhesive tacking points 206. The determined locations may be determined as x, y and z coordinates from an origin point. According to one embodiment, the machine vision system 406 may be configured to determine the locations of the slots in the actuator arms 205 as well as measurements of gaps between selected portions of the HGA (such as the aforementioned long tails of the HGAs) and corresponding selected portions (such as the slots, for example) of the actuator arms 205 of the HSA 204 of a data storage device.

According to one embodiment, the transport mechanism 402 may comprise one or more motors and one or more rails to sequentially transport the HSAs under manufacture to the first zone to be imaged by the machine vision system 406 and from the first zone the second zone of the device 400. According to one embodiment, the second zone may comprise a first adhesive tacking system to apply adhesive to the gaps between the actuator arms 205 and the long tails of the HGAs 202. The first adhesive tacking system may be configured to sequentially apply adhesive to the gaps based upon the measurements of the gaps provided by the machine vision system 406. In one embodiment, as shown in FIG. 4, the multi-zone jet adhesive dispenser assembly 400 may comprise a third zone. The third zone may comprise a second adhesive tacking system, also be configured to apply adhesive to the gaps based upon the measurements of the gaps provided by the machine vision system 406. That is, the first adhesive tacking system in the second zone may be configured to apply some of the adhesive necessary to secure the HGAs 202 to the actuator arms 205 and the second adhesive tacking system in the third zone may be configured to apply some more of the adhesive (or all remaining adhesive) necessary to secure the HGAs 202 to the actuator arms 205. In this manner, the transport mechanism 402 may sequentially carry the HSA under manufacture from a previous manufacturing station to the first zone to enable the machine vision system 406 to locate and measure the gaps where the adhesive is to be applied and from the first zone to the second zone of the device to enable the first adhesive tacking system to apply adhesive to the located and measured gaps and from the second zone to the third zone to apply additional adhesive and/or to carry out other functions. As suggested at 122 and 124 in FIG. 4, the multi-zone jet adhesive dispenser assembly 400 may comprise one or more microprocessors and/or controllers 122 and one or more volatile and/or non-volatile memory stores 124. The memory 124 may be configured to store sequences of instructions that, when executed by processor(s) 122, cause the device 400 to carry out the functionality shown and described herein.

Figure 5:
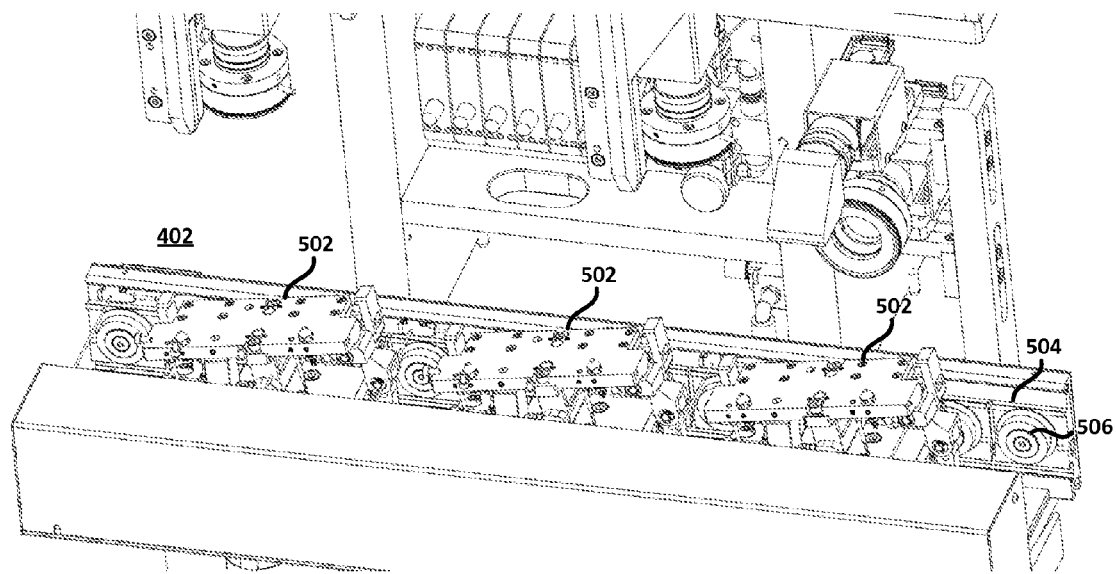
FIG. 5 shows details of the transport mechanism of a multi-zone jet adhesive dispenser assembly according to one embodiment.

FIG. 5 shows details of the transport mechanism 402 of a multi-zone jet adhesive dispenser assembly according to one embodiment. As shown, the transport mechanism 402 may comprise a plurality of movable platforms 502, each configured to support an HSA under manufacture (not shown in FIG. 5). The movable platforms 502 may be configured to roll along rails 504 and rollers 506 between the first zone, the second zone and the third zone of the multi-zone jet adhesive dispenser assembly. The platforms 502 may be configured to transport the HSAs under manufacture from one zone to another and to stop at each zone. Alternatively, the transport mechanism 402 may be configured to continuously transport the HSAs under manufacture from one zone to another, with the machine vision system and the adhesive tacking system(s) configured to image the moving HSAs and to apply the adhesive thereto in a non-contact manner, as the HSAs move from one zone to another.

Figure 6:
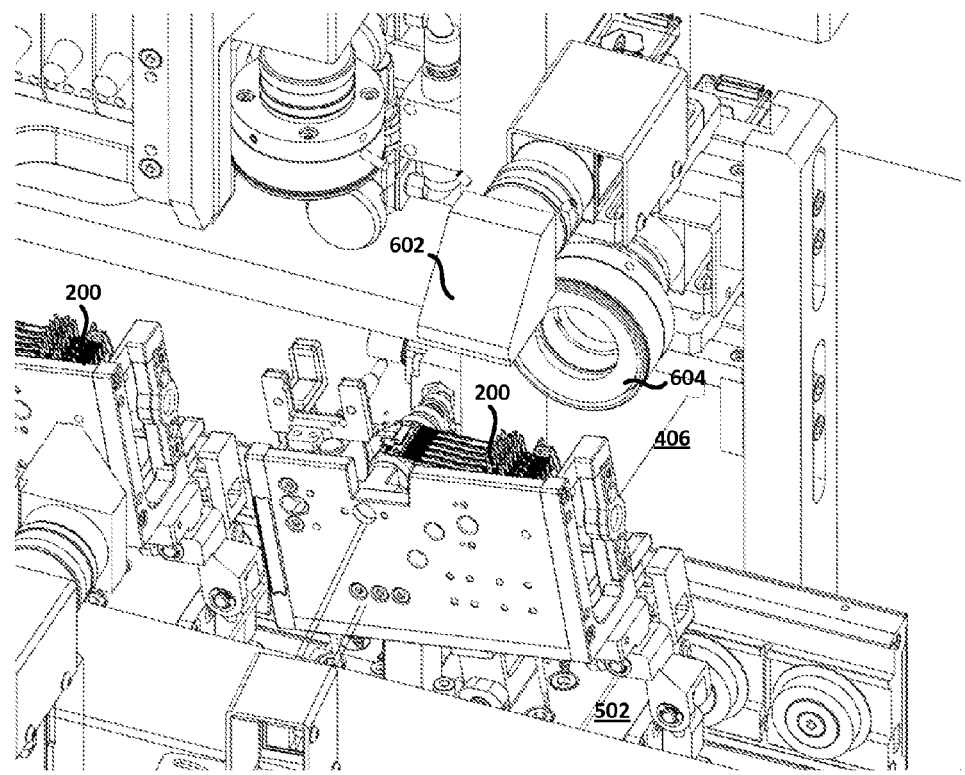
FIG. 6 shows details of a machine vision system of a first zone of a multi-zone jet adhesive dispenser assembly according to one embodiment, showing a downward-looking camera.

As shown in FIG. 6, the machine vision system 406 may comprise a downward-looking camera 602 and/or a side-looking camera 604, configured to obtain sufficient views of the HSA transported to the first zone to enable it to accurately determine the location of adhesive tacking points 206 where the adhesive is to be applied and the width of the gaps between the actuator arms 205 and the HGA long tails. Cameras at other angles may be provided also, or in addition to those shown in FIG. 6. Based upon the image or images obtained, the machine vision system may determine coordinates for the locations where the adhesive is to be applied, to secure the HGAs to the actuator arms 205. These coordinates may then be passed to the adhesive tacking systems of zones 2 and 3, to enable the adhesive jet dispensers thereof to apply the adhesive to the tacking points whose coordinates were determined using the machine vision system 406. In this manner, the adhesive tacking systems of zones 1 and 2 may be configured to move in at least two planes, apply adhesive to the gaps between the HGA and the facing surface of the actuator arm 205 at locations (at least partially) derived from one or more of the measurements provided by the machine vision system 406.

Figure 7:
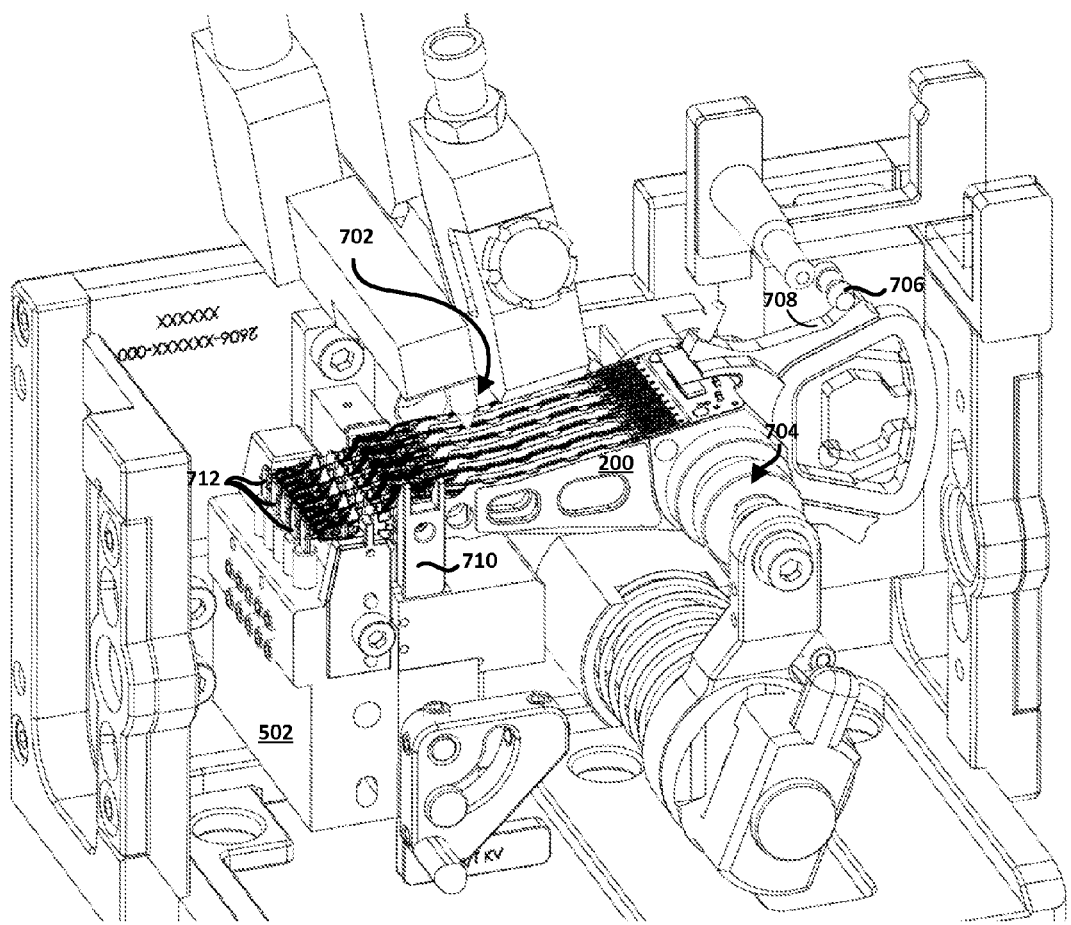
FIG. 7 is a view of an adhesive tacking system, as may be present in a first or second zone of a multi-zone jet adhesive dispenser assembly according to one embodiment.

FIG. 7 is a view of a portion of a jet adhesive dispenser according to one embodiment. FIG. 7 shows a jet adhesive dispenser 702, as may be present in zones 2 and/or 3 of the present multi-zone jet adhesive dispenser assembly. The jet adhesive dispenser 702, according to one embodiment, may be configured to dispense adhesive in a non-contact manner (e.g., at a distance of about 2 mm from its target adhesive application location) as the cradled HSA 200 is moved thereunder. In this manner, the adhesive jet dispenser(s) may be configured to apply the adhesive to the gaps without contacting the HGA or the HSA of the data storage device. The jet adhesive dispenser 702 in one zone may be configured to apply some of the required adhesive at some of the slots of the HSA arms 205, while the jet adhesive dispenser in another zone may be configured to apply adhesive to remaining ones of the slots of the HSA arms 205. Adhesive may be applied simultaneously in zone 1 and in zone 2.

In detail, FIG. 7 shows a HSA cradle configured to orient and immobile the HSA 200 under manufacture on a movable platform 502. As shown, the HSA cradle may be configured to couple to the pivot bearing cartridge of the HSA 200, as shown at 704. Also, the HSA cradle may comprise a positioning pin 706 configured to abut the VCM arms 708. Towards the distal end of the HSA 200, spreaders 710 may be configured to interdigitate between next adjacent ones of the actuator arms 205 and coupled HGAs to precisely spread and immobilize each of the actuator arms and HGAs. This also protects the sliders from damage during manufacture. The HSA cradle may also comprise posts 712 against which the distal lift tabs may rest. In this manner, the HSA under manufacture is both immobilized and properly oriented so that the machine vision system 406 and the adhesive tacking system (s) may image, determine the coordinates of slots of the HSA arms 205 and precisely apply adhesive, respectively.

According to one embodiment, the adhesive tacking system in the first zone or in the second zone may be configured to vary the amount of adhesive applied based upon one or more of the measurements provided by the machine vision system 406. For example, the machine vision system may be configured to measure the width of the gaps between the HGA long tail and the actuator arm 205 at the locations selected for adhesive application (e.g., the slots of actuator arm 205). In one embodiment, the measured width of the gap may determine the amount of adhesive applied thereto. According to one embodiment, the adhesive tacking system may be configured to apply the adhesive in the forms of "dots", with each such dot comprising a predetermined amount of adhesive applied to one location. FIG. 8 is a table relating HGA long tail to HSA gap width measurements to the number adhesive dots applied and the opening time of the jet adhesive dispenser, according to one embodiment. As can be seen in this table, according to one embodiment, the greater the gap width measurement, the greater the number of adhesive dots that are to be applied. In this manner, the adhesive tacking systems of zones and 2 may be configured to apply a number of dots of adhesive to each of the gaps, with the number of dots of adhesive applied being based upon one or more of the measurements provided by the machine vision system 406. Therefore, the amount of adhesive applied to any one location may be adaptive and based upon a measured width of the gap between the HGA long tail and the facing surface of the actuator arm 205. In this implementation, the opening time of the jet adhesive dispenser is constant across all measured widths, but this need not be the case. For example, for large gap widths, a longer opening time may be necessary for the jet adhesive dispenser to have time to apply the needed amount of adhesive, whether in the form of adhesive dots or not. Accordingly, the adhesive tacking systems in zones 1 and 2 may be configured to dispense an exact amount of adhesive depending on the gap or distance between the long tail of the HGA and the slots on the actuator arm 205. The gap and location at which the adhesive is to be applied may be determined by the machine vision system 406 and the resulting measurements may then relayed to adhesive tacking systems in the first zone or in the second zone for on-the-fly adhesive dispensing.

FIG. 9 is a flowchart of a method according to one embodiment. The method may comprise transporting a HSA of a data storage device to a first zone of an adhesive tacking device, as shown at block B91. Using a machine vision system in the first zone of the adhesive tacking device, the gaps between selected portions of a HGA and selected portions of arms of the HSA may be measured and the measurements thereof provided, as shown at B92. Block B93 calls for transporting the HSA from the first zone to a second zone of the adhesive tacking device. The adhesive may then be sequentially applied, in the second zone of the adhesive tacking device, to the gaps based upon at least one of the measurements provided by the machine vision system, as called for by block B94.

According to one embodiment, the amount of adhesive applied to the gaps may be varied based upon one or more of the measurements provided by the machine vision system. For example, the number of dots of adhesive in each of the gaps may be varied, based upon one or more of the measurements provided by the machine vision system. Also, the adhesive may be applied at locations derived (or at least partially derived) from the or some of the measurements provided by the machine vision system. According to one embodiment, the application of the adhesive to the gaps may be carried out without contacting the HGA or the HSA of the data storage device. The adhesive may be applied to the gaps, according to one embodiment, for an amount of time that may be at least partially derived from one or more of the measurements provided by the machine vision system. According to one embodiment, the adhesive dispenser of the adhesive tacking device may be moved in planes parallel to the x, y and/or z axes to apply the adhesive to the gaps at locations that may be at least partially derived from one or more of the measurements provided by the machine vision system. One embodiment includes transporting the HSA of the data storage device from the second zone to a third zone of the adhesive tacking device and applying further adhesive to the gaps in the third zone of the adhesive tacking device based upon one or more of the measurements provided by the machine vision system. According to one embodiment, measuring may include taking an image of the HSA after the HSA has been transported to the first zone of the adhesive tacking device and analyzing the image to provide the measurements of the gaps.

One embodiment is an adhesive tacking device. Such an adhesive tacking device may comprise a machine vision system in a first zone of the device, a first adhesive tacking system in a second zone of the device, a transport mechanism, a processor such as shown at 122 in FIG. 4 and a memory, as shown at reference 124, coupled to the memory 124 the memory storing sequences of instructions that, when executed by the processor 122, cause the device to carry out the steps and functionality shown in FIG. 9 and described herein.

Advantageously, the devices and methods disclosed herein are able to achieve a faster adhesive tacking process to meet stringent HSA automation line cycle time requirements, thereby increasing yield and decreasing costs. The adhesive, according to one embodiment, is also more accurately dispensed, leading to a more consistent adhesive HGA long tail to actuator arm tacking process. Moreover, the non-contact adhesive dispensing of the adhesive tacking systems allows for safer processes that are less likely to lead to damaging electrical static discharge (ESD) damage.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A device, comprising:
a machine vision system in a first zone of the device, the machine vision system being configured to provide measurements of gaps between selected portions of a head gimbal assembly (HGA) and selected portions of arms of a head stack assembly (HSA) of a data storage device;
a first adhesive tacking system in a second zone of the device, the first adhesive tacking system being configured to sequentially apply adhesive to the gaps based upon the measurements of the gaps provided by the machine vision system; and
a transport mechanism configured to sequentially carry the HSA of the data storage device to the first zone to enable the machine vision system to measure the gaps and from the first zone to the second zone of the device to enable the first adhesive tacking system to apply the adhesive to the gaps.

2. The device of claim 1, wherein the first adhesive tacking system is further configured to vary an amount of adhesive applied to the gaps based upon at least one of the measurements provided by the machine vision system.

3. The device of claim 1, wherein the first adhesive tacking system is further configured to apply a number of dots of adhesive to each of the gaps, the number of dots of adhesive applied being based upon at least one of the measurements provided by the machine vision system.

4. The device of claim 1, wherein the first adhesive tacking system is further configured to apply the adhesive to the gaps at locations at least partially derived from at least one of the measurements provided by the machine vision system.

5. The device of claim 1, wherein the first adhesive tacking system comprises an adhesive jet dispenser that is configured to apply the adhesive to the gaps without contacting the HGA or the HSA of the data storage device.

6. The device of claim 1, wherein the first adhesive tacking system comprises an adhesive jet dispenser that is configured to apply the adhesive to the gaps for an amount of time at least partially derived from at least one of the measurements provided by the machine vision system.

7. The device of claim 1, wherein the first adhesive tacking system is further configured to move in at least two planes to apply the adhesive to the gaps at locations at least partially derived from at least one of the measurements provided by the machine vision system.

8. The device of claim 1, further comprising a second adhesive tacking system in a third zone of the device, the second adhesive tacking system being configured to sequentially apply adhesive to the gaps based upon at least one of the measurements provided by the machine vision system; and wherein the transport mechanism is further configured to sequentially carry the HSA of the data storage device from the second zone to the third zone of the device to enable the second adhesive tacking system to apply the adhesive to the gaps.

9. The device of claim 1, wherein the machine vision system comprises a camera configured to take an image of the HSA after the HSA has been moved to the first zone by the transport mechanism.

10. A method, comprising:
transporting a head stack assembly (HSA) of a data storage device to a first zone of an adhesive tacking device;
measuring, using a machine vision system in the first zone of the adhesive tacking device, gaps between selected portions of a head gimbal assembly (HGA) and selected portions of arms of the HSA and providing measurements thereof;
transporting the HSA from the first zone to a second zone of the adhesive tacking device; and
sequentially applying adhesive, in the second zone of the adhesive tacking device, to the gaps based upon at least one of the measurements provided by the machine vision system.

11. The method of claim 10, further comprising varying an amount of adhesive applied to the gaps based upon at least one of the measurements provided by the machine vision system.

12. The method of claim 10, further comprising applying a number of dots of adhesive in each of the gaps, the number of dots of adhesive applied being based upon at least one of the measurements provided by the machine vision system.

13. The method of claim 10, further comprising applying the adhesive to the gaps at locations at least partially derived from at least one of the measurements provided by the machine vision system.

14. The method of claim 10, wherein sequentially applying comprises applying the adhesive to the gaps without contacting the HGA or the HSA of the data storage device.

15. The method of claim 10, wherein sequentially applying comprises applying the adhesive to the gaps for an amount of time at least partially derived from at least one of the measurements provided by the machine vision system.

16. The method of claim 10, wherein sequentially applying further comprises moving an adhesive dispenser of the adhesive tacking device in at least two planes to apply the adhesive to the gaps at locations at least partially derived from at least one of the measurements provided by the machine vision system.

17. The method of claim 10, further comprising transporting the HSA of the data storage device from the second zone to a third zone of the adhesive tacking device and applying further adhesive to the gaps in the third zone of the adhesive tacking device based upon at least one of the measurements provided by the machine vision system.

18. The method of claim 10, wherein measuring comprises taking an image of the HSA after the HSA has been transported to the first zone of the adhesive tacking device and analyzing the image to provide the measurements of the gaps.

19. An adhesive tacking device, comprising:
a machine vision system in a first zone of the device,
a first adhesive tacking system in a second zone of the device;
a transport mechanism;
a processor; and
memory coupled to the processor, the memory storing sequences of instructions that, when executed by the processor, cause the device to:

transport a head stack assembly (HSA) of a data storage device to the first zone of the adhesive tacking device;

measure, using the machine vision system in the first zone of the adhesive tacking device, gaps between selected portions of a head gimbal assembly (HGA) of the HSA and selected portions of arms of the HSA and provide measurements thereof;

transport the HSA from the first zone to a second zone of the adhesive tacking device; and sequentially apply adhesive, in the second zone of the adhesive tacking device, to the gaps based upon at least one of the measurements provided by the machine vision system.

* * * * *